July 22, 1924.
C. F. LICK
1,502,434
AUTOMATIC SIGNAL AND SAFETY DEVICE FOR MOTION PICTURE MACHINES
Original Filed Feb. 23, 1921    3 Sheets-Sheet 1
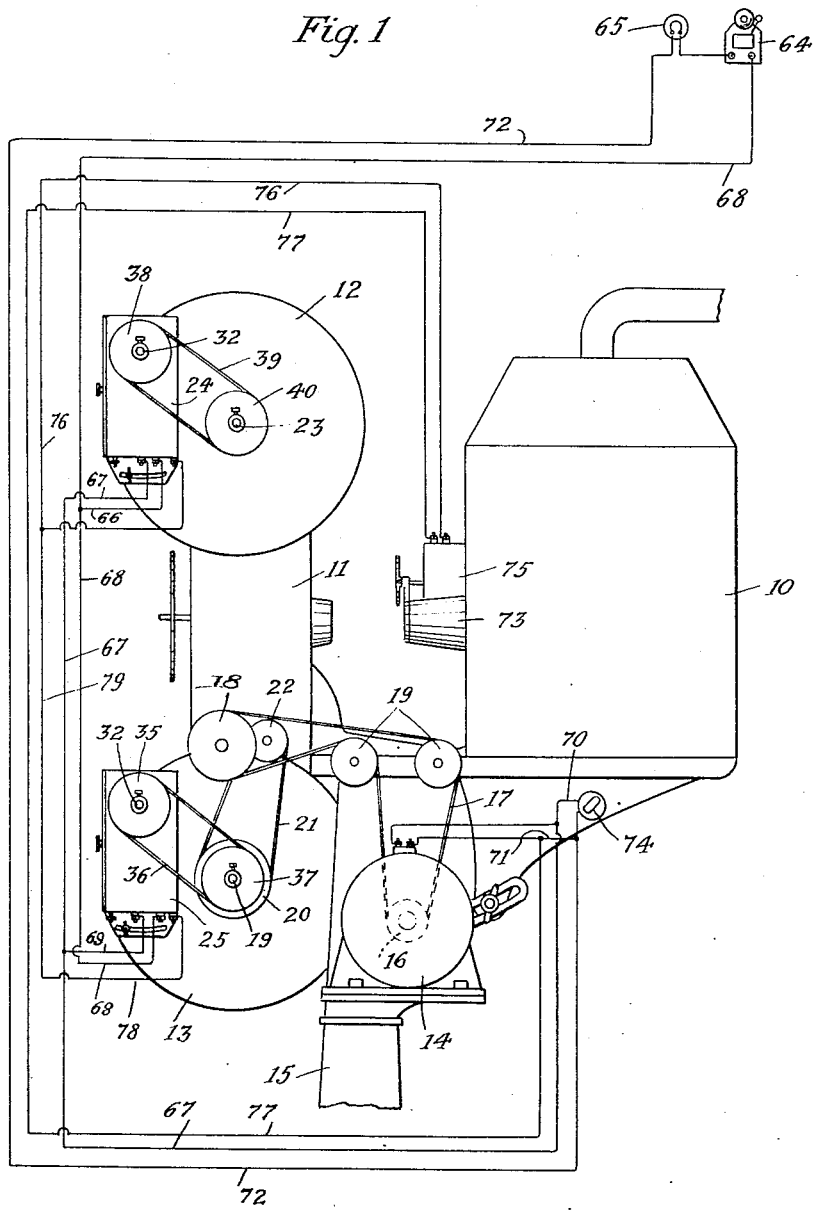
Inventor:
Carl F. Lick.
By Howard Fick,
his Attorney.

July 22, 1924.

C. F. LICK 1,502,434

AUTOMATIC SIGNAL AND SAFETY DEVICE FOR MOTION PICTURE MACHINES

Original Filed Feb. 23, 1921    3 Sheets-Sheet 2

Inventor:
Carl F. Lick.
By Howard Lick
his Attorney.

July 22, 1924.
C. F. LICK
1,502,434
AUTOMATIC SIGNAL AND SAFETY DEVICE FOR MOTION PICTURE MACHINES
Original Filed Feb. 23, 1921   3 Sheets-Sheet 3
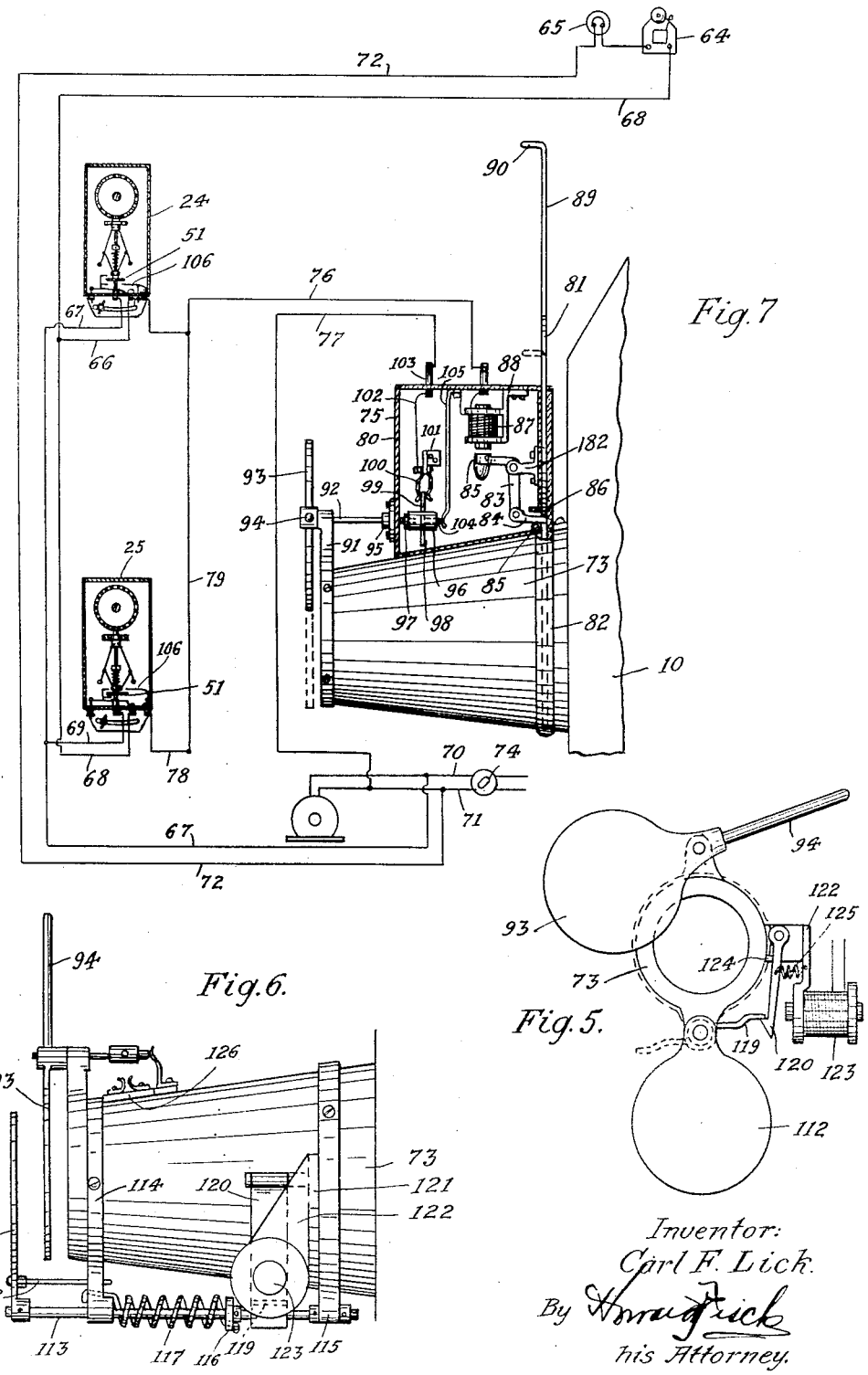
Inventor:
Carl F. Lick.
By his Attorney.

Patented July 22, 1924.

1,502,434

UNITED STATES PATENT OFFICE.

CARL F. LICK, OF ST. PAUL, MINNESOTA.

AUTOMATIC SIGNAL AND SAFETY DEVICE FOR MOTION-PICTURE MACHINES.

Application filed February 23, 1921, Serial No. 447,108. Renewed May 15, 1924.

*To all whom it may concern:*

Be it known that I, CARL F. LICK, a citizen of the United States, residing at St. Paul, in the county of Ramsey and State of Minnesota, have invented a new and useful Improvement in Automatic Signal and Safety Devices for Motion-Picture Machines, of which the following is a specification.

My invention relates to automatic signal and safety devices for motion picture projecting machines and has for an object to provide a device adapted to inform the operator of a motion picture projecting machine of any trouble with the film or film operating mechanism which would cause the film to stop in its movement through the operating mechanism or to travel too fast or too slowly.

Another object of my invention is to provide a device adapted to automatically cut off the light from the lamp house the moment anything goes wrong with the film or film operating mechanism.

In carrying out my invention I employ a pair of governors driven from the film reel shafts and adapted to complete electrical circuits connected with suitable signal devices when the reel film shafts travel too slowly or too rapidly or completely stop. In combination with these governors I use a device normally held from cutting off the light from the lamp house by a latch and an electric magnet, controlled by said governors for unlatching said latching means at the same time that the signals are rendered operative to simultaneously cut off the light from the lamp house.

The full objects and advantages of my invention will appear in connection with the detailed description thereof and are particularly pointed out in the claims.

In the drawings, illustrating the application of my invention in one form:—

Fig. 1 is an elevational view of a motion picture projecting machine showing the application of my invention thereto.

Fig. 5 is a detail view of one form of the shutter for cutting off the light from the lamp house.

Fig. 6 is a side view of the portion of the invention shown in Figure 5.

Fig. 7 is a view showing the circuit of the device for shutting off the light from the lamp house illustrating the operating mechanism in detail.

Figure 3:
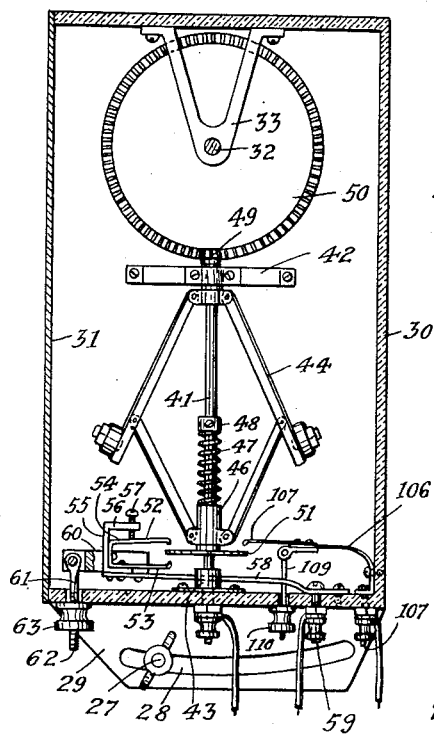
Fig. 3 is a vertical sectional view of the parts shown in Figure 2 taken on line 3—3 of Figure 2.

In the drawings an ordinary form of motion picture projecting machine is illustrated having a lamp house 10 provided with a lens holder 73, and an operating mechanism 11 provided with two film magazines 12 and 13 and an electrical motor 14, all mounted on a cast iron pedestal 15 in the relative positions indicated. Motor 14 is provided with a pulley 16 over which passes a belt 17 adapted to drive the operating mechanism 11 through a pulley 18. Belt 17 also passes over two idler pullies 19 which serve to change the direction of travel of the same as required in the drive, and form part of a belt tightening device for said belt. The reel within the magazine 13 is driven through a shaft 19 by a pulley 20 mounted thereon over which passes a belt 21 driven from a pulley 22 connected with the operating mechanism 11. The reel within magazine 12 is mounted on a shaft 23.

My invention comprises primarily two devices 24 and 25, which are driven from the reels and are adapted to complete circuits, in a manner to be later described, when the reels travel at too great or too slow a speed. These devices have connected to them conductors 66, 67, 68, and 69, conductor 68 being connected to one side of an electric bell 64 connected in series with an incandescent lamp 65, while conductor 67 is connected to one side 70 of the service line feeding the motor 16 on the motor side of a motor switch 74. The other side 71 of the service line is connected directly to the incandescent lamp 65 by a conductor 72. Conductor 66 is connected to conductor 68 and conductor 69 is connected to conductor 67 so that when either of the circuits leading up to the devices 24 and 25 are closed within the device, in a manner to be presently described, the entire circuit including the incandescent lamp 65 and the bell 64 is completed causing these signal devices to become operative. With this construction it can be clearly seen that the stopping of the mechanism driving either of the reels will cause the signaling device to become operative.

If the film should break below the mechanism 11 the reel within magazine 13 due to its driving mechanism would immediately start to speed up which would operate device 25 to close the circuit 68—69, thereby actuating the lamp 65 and bell 64. At the same time if the film broke between the reel within magazine 12 and the operating mechanism 11 said reel would stop rotating, having no positive drive from the mechanism of the projector and in a similar manner would close circuit 66, 67 actuating lamp 65 and buzzer 64. If desired, the mechanism within the device 24 can be adjusted so that when the film on the reel within magazine 12 is practically unwound then said device becomes operative due to the increased speed of shaft 23 and thereby warns the operator through the signal devices 64 and 65 that said reel is nearly unwound so that he may take the necessary steps to make the proper change of reels.

In addition to the signal apparatus for advising the operator of the projector of trouble with the apparatus I employ a device indicated at 75 for cutting off the light passing through a circuit comprising conductors 76 and 77 of which conductor 77 is connected directly to the side 71 of the service line, and conductor 76 is connected by leads 78 and 79 to the above mentioned devices 24 and 25, which through leads 66 and 68 complete the circuit to the other side 70 of the service line when the respective mechanism 24 and 25 become operable. The exact operation of this mechanism will be later described.

Figure 4:
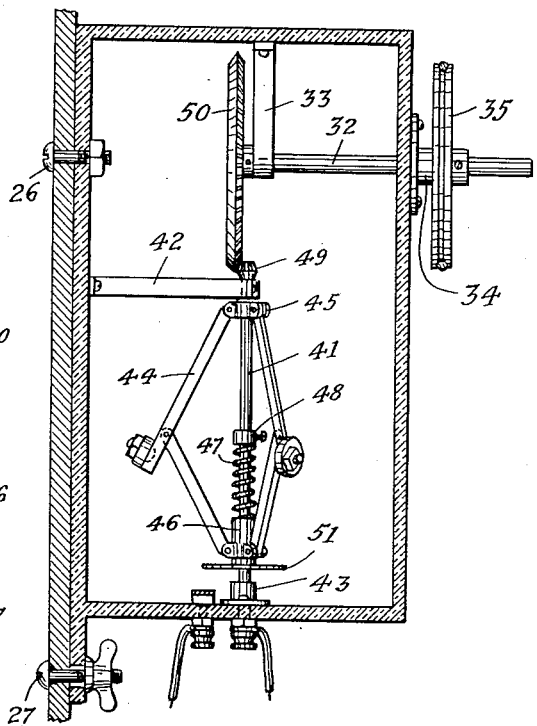
Fig. 4 is a view similar to Figure 3 taken on line 4—4 of Figure 2.
Figure 2:
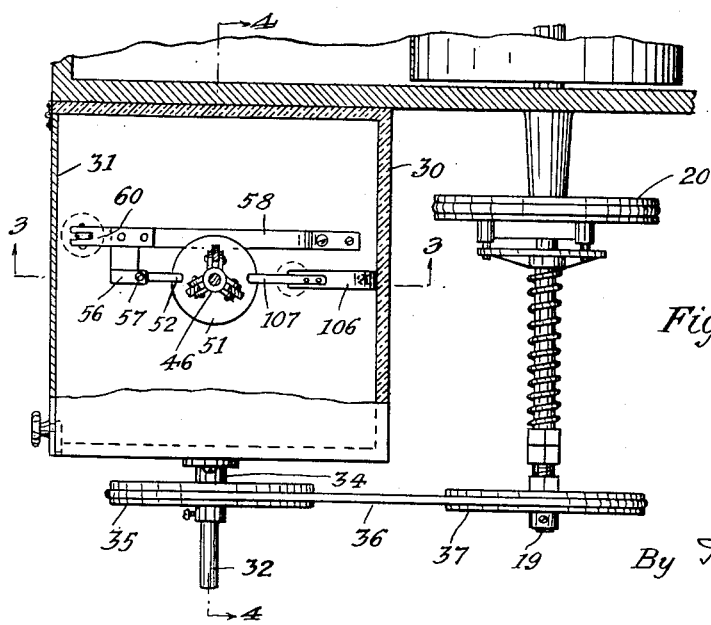
Fig. 2 is a part sectional plan view of one of the governors of my invention showing the driving mechanism operating the same.

The portion of mechanism 25 which operates the signal devices of my invention is shown in detail in Figures 2, 3, and 4, and comprises a casing 30 which is constructed of some insulating material such as fiber or hard rubber, and is formed with a hinged door 31 on one side thereof and has a horizontal shaft 32 journaled in a bearing 33 suspended from the upper portion of casing 30 within the same and an internal bearing 34 mounted on a wall of said casing. Shaft 32 protrudes through the casing and is provided on the exterior with a pulley 35 which is directly driven from shaft 19 by a belt 36 passing over a pulley 37 mounted on the shaft 19. In a similar manner shaft 32 of mechanism 24 has secured to it a pulley 38 driven by a belt 39 passing over a pulley 40 mounted on shaft 23. Within the casing 30 is rotatably mounted a shaft 41 journaled in bearings 42 and 43 secured to the walls of casing 30. Shaft 41 has mounted on it a centrifugal governor 44 fastened to said shaft at 45 and having a slidable portion 46 acting against a coil spring 47 mounted on said shaft and seated against a collar 48 secured thereto. Shaft 41 is driven through a bevel pinion 49 meshing with a bevel gear 50 mounted on the end of shaft 32. As the shaft 41 is rotated by the rotation of the reel shaft the slidable portion 46 of governor 44 is caused to advance and retreat along shaft 41 depending upon the speed of the reel shaft of the projector. The devices 24 and 25 are secured to the magazine housings 12 and 13 by bolts 26 and 27 passing through holes 28 and protruding portions 29 of the casings 30 of these devices which permit a horizontal adjustment of the mechanism when the entire projector is inclined as is often required in motion picture projecting machines.

Within the casing 30 is located a device for completing the circuit leading to lamp 65 and buzzer 64 which includes a disk 51 secured to the slidable portion 46 of governor 44. This disk is adapted to engage either of two contacts 52 or 53 formed on the end of a U shaped spring 54 secured to a casting 55. Casting 55 is formed with an arm 56 carrying a screw 57 by means of which a portion of spring 54 may be moved so as to cause the two contacts 52 and 53 to approach or be moved away from each other. Casting 55 as clearly indicated in Figure 3, is secured to a spring member 58 which is bolted to the casing 30 and is provided with a binding post 59. By bending spring 58 adjustment of both of the contacts 52 and 53 relative to disk 51 may be had so that the minimum speed at which the governor 44 is to operate the signal device may be determined. By adjustment of the screw 57 the maximum speed at which the governor is to operate the signal device may be determined. The device for securing the movement of spring 58 comprises a finger 60 having pivoted thereto an arm 61 extending through the case 30. This arm is threaded at 62 and is provided with a thumb screw 63 adapted to engage the underside of casing 30 and to draw down casting 55 against the action of spring 58. After screw 63 is rotated the contacts 52 and 53 are simultaneously moved up and down varying their position relative to disk 51.

The mechanism 75 is best shown in detail in Figure 7 and comprises mainly a casing 80 which is secured to the lens housing 73 and which has slidably mounted on it at its extreme end a shutter 81 moving vertically in guides 82 formed on the lamp housing 73 so that when said shutter falls by gravity it extends across the opening through said lens holder and completely cuts off the light passing through the same. Within casing 80 is mounted a bracket 182 to which is pivoted a swinging crank 83 having at one end a lever 84 pivoted to it, which lever is adapted to rest on a roller 85 mounted within said casing and to engage the underside of the shutter 81 at 86 to hold said shutter in an elevated position as shown in full lines in Figure 7, permitting a free passageway of light through the lens holder 73. The other end of crank arm 83 is provided with a head 85 adapted to be attracted by an electro-magnet 87 secured to a bracket 88 mounted on the casing 80. As the electromagnet 87 becomes actuated, head 85 is thrown backward towards it which actuates finger 84 causing it to be withdrawn from in under the shutter 81 and permits the same to drop as indicated in dotted lines in Figure 7, to cut off the flow of light through the lens holder 73 thus obscuring the light from the screen and preventing heating of the film in the operating mechanism 11, which, as is well known, often causes the film to ignite incurring damage to the surrounding property. Electro-magnet 87 is connected in the circuit 76—77 so that when this circuit is closed by the devices 24 and 25 in a manner to be presently explained, the lever 83 is rendered operable and the light cut off from the lamp house. After each operation of magnet 87 the operator has to replace shutter 81 in the position shown in full lines in Figure 7, which is made possible by a handle 89 secured to said shutter and having a hooked portion 90 for lifting the same.

To prevent the shutter 81 from dropping when the switch 74 is first thrown on which would naturally be the effect since both of the devices 24 and 25 are normally at rest when the apparatus is started and the respective circuits within the same closed, I employ a device which is clearly shown in detail in Figure 7. On the lamp housing 73 is usually mounted a bracket 91 which has journaled in it a shaft 92 to which is pivoted a shutter 93 formed with an extending handle 94. This shutter is adapted to cut off the light passing through the lens holder 73 and is only operable by hand, being used in starting or stopping the film. In my invention I extend shaft 92 through the casing 80 journaling it in a box 95 mounted on said casing. Immediately within casing 80 I provide a fiber cylinder 96 which is screwed onto the end of shaft 92 and held in place thereon by a lock nut 97. At oppositely extending portions of cylinder 96 I provide two fingers 98 and 99 which are screwed into said cylinder and which are adapted to engage a pair of clips 100 so as to make electrical contact with the same. These clips are supported on a bracket 101 secured to the casing 75 and are electrically connected by a conductor 102 to a terminal 103 to which lead 77 is attached. For holding the fingers 98 and 99 in place I provide a set screw 104 preferably formed with a round head which is screwed into cylinder 96 in axial alinement with shaft 92 securely clamping both of members 98 and 99 in place and having its head extending beyond said cylinder. A spring 105 secured to the casing 80 is adapted to engage the head of set screw 104 and is connected to one of the terminals of the electro-magnet 87. The circuit can be followed by tracing from conductor 77 through conductor 102, the spring clip 100, fingers 99 and 98, set screw 104 spring finger 105 and electromagnet 87 to the conductor 76. The operation of this portion of the invention becomes evident. When the operator of the projecting machine leaves his machine for the day he always turns the shutter 93 so as to cut off the light passing through lens holder 73. This rotates fingers 98 and 99 away from clip 100 thereby breaking the circuit 76—77 as the machine stops. The circuit, however, is closed through the apparatus 24 and 25 as will be presently explained. When the operator wishes to start the apparatus he immediately turns on switch 74 and through the break in circuit 76—77 through fingers 99 and 98 and the clip 100 the magnet 87 is still rendered inoperable. As the reel shafts 23 and 19 speed up, circuit 76 and 77 is broken within the apparatus 24 and 25 after which time the shutter 93 may be swung in its normal position to permit passage of light through the lens holder 73. This, as will be seen in Figure 7, closes circuit 76—77 through fingers 98 and 99 of the clip 100 so that as soon as the devices 24 and 25 become operable through trouble with the film the mechanism within casing 80 may be actuated to drop shutter 81. The utility of the two fingers 98 and 99 lies in the fact that shutter 93 which is free to rotate about the axis may be swung either to the left or the right and make contact with the clips 100 in either of its open positions. Finger 105 permits shutter 93 to be completely rotated in either direction without affecting the operation of the device.

The means within the apparatus 24 and 25 for closing circuit 76—77 is shown in Figure 7, and is also shown in detail in Figures 2 and 3. Each of these devices comprise a spring arm 106 secured to a binding post 107 to which is attached the conductors 78 and 79. This spring is positioned with its extreme end 107 in proximity to the disk 51 so that as said disk rotates a contact is made between said disk and arm 106 to complete the circuit through leads 66 and 68 back to the side 70 of the line. For adjusting the position of spring arm 106 I employ a casting 109 extending through the bottom of the casing 30 and provided with a thumb nut 110 similar to nut 63 of the other part of this invention. By screwing nut 110 the relative position 107 of spring arm 106, to the disk 51, can be adjusted to operate the shutter 81 at any predetermined speed of either of the reel shafts 23 and 19. In Figure 7 it will be noticed that in the device 25 spring arm 106 is located above disk 51 while in the device 24 said spring arm 106 is located below disk 51. This arrangement is made for the following reasons. When the film breaks, either the reel shaft 23 completely stops or the shaft 19 commences to speed up, since there is no driving mechanism on shaft 23. A break in the film between the mechanism 11 and the reel within magazine 12 causes said shaft to cease rotating. This releases the governor permitting disk 51 to descend and make contact with the arm 106. On the contrary, shaft 19 immediately speeds up in the event of the break in the film between the mechanism 11 and the reel within magazine 13 thereby causing disk 51 to rise and make contact with the arm 106.

An alternate form of the mechanism indicated at 75 is shown in Figures 5 and 6. In place of the slidable shutter 81, I employ an oscillating shutter 112 secured to a shaft 113 journaled in bearings 114 and 115 which are secured to the lens holder 73. Shaft 113 has rigidly attached to it a collar 116 to which is fastened one end of a coil spring mounted on said shaft and having its other end fastened to the bearing member 114. This spring serves as a tortion spring and tends to hold shutter 12 in its closed position as indicated in Figure 6 in full lines, the motion of which is arrested by means of a pin 118 secured to said shutter which engages a portion of the bearing 114. In using the device, shutter 112 is grasped by the hand and rotated to the position shown in full lines in Figure 5. It is held in this position by means of an arm 119 secured to shaft 113 which engages a trip 120 as indicated in Figure 5. This trip is pivoted to an arm 121 extending outwardly from a portion of the bearing member 115 which arm terminates in a bracket 122 supporting an electro-magnet 123. Magnet 123 is so positioned as to attract the trip 120 to release lever 119 and permit the shutter 112 to be retracted into its closed position by the spring 117. A spring 125 acting between the bracket 122 and said trip 120 holds it in a position in which it may be engaged by the arm 119, the movement of said trip being terminated by a stop 124 formed on the member 121. Instead of mounting the mechanism attached to the shaft 92 of shutter 93 to a casing enclosing the same, these parts are mounted on an insulating base 126 secured directly to the lens holder 73 as indicated in Figure 6. The functioning of this apparatus is identical with that previously explained and simply indicates a device which may be substituted in place thereof.

In the various forms of my invention I have shown the device as operated from the circuit supplying current to the motor of the projector by placing my bell and electric light in series in this circuit. The same results may be effectively accomplished by operating these circuits from a low voltage battery or generator by simply connecting the leads 77, 76 and 72 from the line 70—71 to the required source of electrical supply instead of taking the current from the line.

The advantages of my invention are manifest. Any trouble with the operation of the film or mechanism driving the same is quickly indicated by the signaling device included in my invention. If the film breaks while going through the operating mechanism between either of the reels the signal is actuated. If the belt turning the operating mechanism of the lower reel or the main belt breaks the signal is likewise indicated due to the closing of the signal contact upon stopping of the governor. If the film winds around any of the sprockets the signal is actuated or if the tension on the lower take-up of the lower reel becomes oily and slips the same result is secured. If the lower reel is bent and the film does not roll up tightly on the reel it will cause a bulge of the film on one side of the reel which will cause the reel to become heavy on that side and stop, thereby actuating the signal. In the event that the film breaks between the lower reel and the actuated mechanism the film will accumulate in the operating head damaging anywhere from thirty to forty feet of film. This damage is eliminated by my invention as the operator is warned the minute the breakage of the film occurs. Any danger of fire from concentration of the arc light on the area of the film exposed in the operating head is eliminated by the portion of my invention which cuts off the light from the machine. If desired, the signal device in connection with the upper reel may be used to advise the operator when the reel is nearly unwound so that he may take the necessary steps to change reels before the end of the reel in the machine.

In accordance with the patent statutes I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims:

I claim:

1. In combination with a reel shaft of a motion picture projecting machine, a shutter adapted to cut off the light through the projecting machine, and means operated from said reel shaft adapted to actuate said shutter.

2. In combination with a reel shaft of a motion picture projecting machine, a shutter adapted to cut off the light through the projecting machine, means adapted to be operated from said reel shaft normally held in inoperative position and adapted to control said shutter upon variations in speed of said reel shaft.

3. In combination with a motion picture projecting machine, a governor, a signal and means connected with said governor for actuating said signal upon increase or decrease of the speed thereof.

4. In combination with a reel shaft of a motion picture projecting machine, a shutter adapted to cut off the light through the projecting machine, a normally open circuit connected to said shutter adapted to actuate the same and means operated from said reel shaft for closing said circuit upon variations of the speed of said reel shaft.

5. In combination with a reel shaft of a motion picture projecting machine, a shutter adapted to cut off the light through the projecting machine, a rotatable member driven from said reel shaft and responsive to variations in the speed of rotations of said shaft and means actuated by said rotatable member for closing said circuit.

6. In combination with a reel shaft of a motion picture projecting machine, a shutter adapted to cut off the light through the said machine, a signaling device, and means actuated by said shaft for simultaneously controlling said shutter and signalling device, said means being responsive to variations in the speed of rotation of said reel shaft.

7. In combination with a reel shaft of a motion picture projecting machine, a governor operated thereby, a signal, a double switch, a circuit connecting said switch and signal, means actuated by said governor for closing either of said switches when the speed of the reel shaft is increased or decreased above or below normal.

8. In combination with a reel shaft of a motion picture projecting machine, a centrifugally operated rotatable member driven from said reel shaft, a shutter adapted to cut off the light through the machine, a normally open circuit for actuating said shutter and means actuated by said rotatable member for completing said circuit.

9. In combination with a reel shaft of a motion picture projecting machine, a centrifugally operated rotatable member driven from said reel shaft, a signalling device, a normally open circuit actuating said signalling device and a shutter adapted to cut off the light through the machine, means for operating said shutter, a normally open circuit actuating said operating means and means actuated by said rotatable member for simultaneously completing said circuits.

10. In combination with a reel shaft of a motion picture projecting machine, a centrifugally operated rotatable member driven from said reel shaft, a signalling device, a normally open circuit actuating said signalling device, a shutter adapted to cut off the light through the machine, means for operating said shutter, a normally open circuit actuating said operating means and means actuated by said rotatable member for completing said circuits.

11. In combination with a reel shaft of a motion picture projecting machine, a signalling device, a rotatable shaft driven from said reel shaft, a centrifugally operated slidable member mounted on said shaft, a disk secured to said slideable member, a pair of contacts positioned on either side of said disk, a normally open circuit for actuating said signalling device connected to said disk and contact members adapted to be closed upon variations in the speed of said shaft.

12. In combination with a reel shaft of a motion picture projecting machine, a signalling device, a rotatable shaft driven from said reel shaft, a centrifugally operated slidable member mounted on said shaft, a disk secured to said slideable member, a pair of contacts positioned on either side of said disk, a normally open circuit for actuating said signalling device connected to said disk and contact members adapted to be closed upon variations in the speed of said shaft, and means for adjustably varying the relative positions of said contact points with one another and the disk.

13. In combination with a motion picture projecting machine having a reel and mechanism for moving the film through the machine, and a source of light, a shutter adapted to cut off said source of light from the machine, a second shutter adapted to cut off the said source of light from the machine, means connected with said first shutter for controlling the same and means associated with said second shutter for rendering said controlling means operable or inoperable at will.

14. In combination with a motion picture projecting machine, a governor driven thereby, a signal, a forked switch member, a circuit connecting said switch member and signal, a member movable with said governor adapted to operate said forked switch member to close the circuit upon movement of the governor in either direction from normal position.

15. In combination with a motion picture projecting machine, a governor driven thereby, a signal, a forked switch member, a circuit connecting said switch member, and signal, a member movable with said governor adapted to operate said forked switch member to close the circuit upon movement of the governor in either direction from normal position, and means for adjusting said forked member relative to the switch closing member.

16. In combination with a motion picture projecting machine, a governor, a signal, a forked switch member having a pair of arms, a circuit connecting said switch member with said signal, a switch closing device connected with said governor, adapted to move between said arms to actuate said signal upon movement of the governor in either direction, means for bodily adjusting said switch closing member and means for independently adjusting said arms relative to one another.

17. In combination with the lens housing of a motion picture machine, a bracket attached thereto, a spindle rotatively mounted within said bracket, a tortional coil spring mounted upon said spindle and secured at one end thereto, and at its other end to said bracket, a shutter secured to said spindle and adapted to be moved in front of the lens housing aperture by means of said spring, a latch for holding said shutter away from said lens housing aperture, a governor responsive to increase or decrease in the speed of the signal and means operated by said governor for releasing said latch when the speed of the reel shaft increases or decreases above or below normal.

In testimony whereof I affix my signature.

CARL F. LICK.